United States Patent
Wu

(10) Patent No.: US 6,480,317 B2
(45) Date of Patent: Nov. 12, 2002

(54) SCANNING APPARATUS CAPABLE OF LOCATING THE SCANNING STARTING POINT THEREOF

(75) Inventor: Yung-Chuan Wu, Pingjen (TW)

(73) Assignee: Avision Inc., Hsinchu (TW)

( * ) Notice: Subject to any disclaimer, the term of this patent is extended or adjusted under 35 U.S.C. 154(b) by 84 days.

(21) Appl. No.: 09/779,602

(22) Filed: Feb. 9, 2001

(65) Prior Publication Data

US 2001/0013968 A1 Aug. 16, 2001

(30) Foreign Application Priority Data

Feb. 11, 2000 (TW) ........................................ 89102365 A

(51) Int. Cl.⁷ .............................................. G02B 26/08
(52) U.S. Cl. ........................................ 359/196; 358/497
(58) Field of Search ................................ 359/196, 223; 358/474, 494, 497, 488

(56) References Cited

U.S. PATENT DOCUMENTS 6,229,629 B1 * 5/2001 Tsai ............................ 358/486

* cited by examiner

*Primary Examiner*—James Phan
(74) *Attorney, Agent, or Firm*—Rabin & Berdo, P.C.

(57) ABSTRACT

A scanning apparatus capable of locating a scanning starting point. The scanning apparatus includes a housing, a carriage, and a calibration paper. The housing includes a scanning platen for supporting a document to be scanned. The calibration paper is mounted on the scanning platen, adjoins one of the shorter sides of the scanning platen, and has a marked area. The marked area is defined by a set of functions and includes the scanning starting point for indicating users to locate the document to be scanned on the scanning platen according to the scanning starting point. When the carriage is moved to a scanning line, the carriage locates the scanning starting point according to the intersections of the marked area being scanned and the scanning line, and the set of functions defining the marked area.

10 Claims, 5 Drawing Sheets

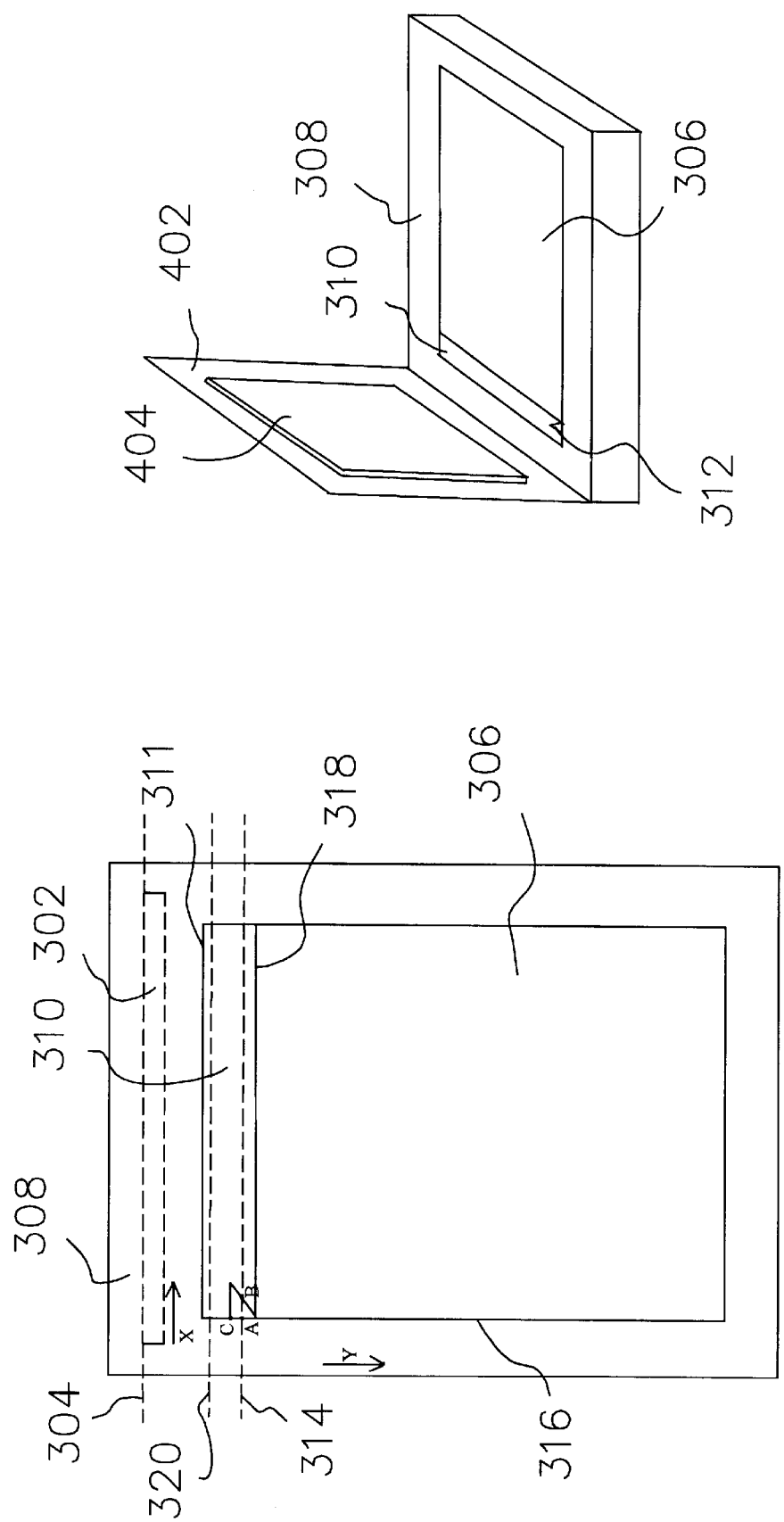

SCANNING APPARATUS CAPABLE OF LOCATING THE SCANNING STARTING POINT THEREOF

BACKGROUND OF THE INVENTION

This application incorporates by reference Taiwanese application Serial No. 89102365, filed on Feb. 11, 2000.

1. Field of the Invention

The invention relates in general to a scanning apparatus which is capable of locating the scanning starting point thereof, and more particularly to a scanning apparatus which is capable of locating the scanning starting point in an accurate and effective manner.

2. Description of the Related Art

In this multimedia age, scanners are becoming peripherals of wide usage. The users of scanners are interested in and demand a high quality and speed of scanning. For designing scanners meeting their needs, the operation of locating the starting point for scanning is concerned. A stepping motor conventionally drives the carriage of a scanner. When the carriage completes its scanning operation, it is required to return to its home position (i.e. the position where the carriage stays when idled and begins to move when starting to scan an object). However, this final operation may not always return the carriage to the same home position exactly. If the carriage is not returned to the home position exactly, it may result in the loss of part of the image of a scanned document or the capturing of the unnecessary image that is of no part of the scanned document. If the carriage can be accurately and effectively moved from the home position to the scanning starting point for document scanning, the errors mentioned above are avoided, resulting in a higher quality of scanning.

In the conventional approach to scanning a document, a predetermined reference point is first searched. The scanning starting point is then determined according to a predetermined displacement vector relation between the coordinates of the reference point and the scanning starting point. Once the scanning starting point is obtained, the scanning operations are able to start. There are two conventional methods for locating the scanning starting point as follows.

(a) Referring to FIG. 1, it illustrates the method for locating the scanning starting point by using the angle of the reflection region 12 on the calibration paper 10 as a reference point Q. This method is disclosed in the Taiwanese patent publication, serial No. 147499. The method utilizes the principle that the displacement vector relation between the reference point Q and the scanning starting point P is predetermined before leaving the factory. Thus, for obtaining the reference point Q, the carriage 11 slowly moves along the Y-axis and detects the difference of color between the reflection region 12 and the calibration paper 10. After obtaining the reference point Q, the scanning starting point P is determined according to the predetermined relative displacement. Therefore, the carriage can move to the scanning starting point P and begin scanning an object.

(b) Referring to FIG. 2, it illustrates the method for locating the scanning starting point by using the predefined mark 22 on the calibration paper 20, which is disclosed in the Taiwanese patent publication, serial No. 338868. It describes that when the carriage obtains the reference points Q1 and Q2 in a scanning line of the mark 22, the scanning starting point P is determined according to the predefined function of the coordinates of the two reference points and the mark 22, and the predetermined distance of a reference point Q and the scanning starting point P. Thus, the carriage begins to scan the object by the scanning starting point P.

However, in the conventional method illustrated in FIG. 1, since it is required that the carriage 11 slowly search for the reference point Q along the Y-axis and then moving to the scanning starting point P, the scanning speed per document is highly reduced. Moreover, in the manufacturing of the products according to the two conventional methods mentioned above, there may be errors in placing the reference point, resulting in a degradation of the quality of scanning. During the conventional method of printing a reflection region or a mark and installing a calibration paper, three errors may occur.

(1) Molding error. Since the calibration paper is of a certain thickness, a fillister is provided in the mold of the housing of the apparatus for the operator to stick the calibration paper. Thus, the error occurs in the process of making the mold.

(2) The error in the process of printing and cutting of the calibration paper. The calibration paper is made by printing individual reflection regions and marks onto a large piece of material before it is spliced into individual calibration papers. This may result in errors in printing and non-uniform size of the calibration papers due to inaccurate cutting.

(3) The error during sticking. This error occurs during sticking the calibration paper to the body of the scanning apparatus. The position that the calibration paper is stuck at may be inaccurate, resulting in errors when using the predetermined position and displacement vector relation.

When the carriage is moved for scanning an object, the unit of movement of it is in pixel (picture element) on the X- or Y-axis. For a common scanner with a resolution of 600 dpi (dot per inch), i.e. there are 600 picture elements per inch, the errors mentioned above are unacceptable. For scanner apparatus with higher resolution requirements, it is unacceptable and unavoidable.

SUMMARY OF THE INVENTION

It is therefore an object of the invention to provide a scanning apparatus capable of locating a scanning starting point. The scanning starting point is set for the scanning apparatus and no reference point is set. After locating the scanning starting point, the scanning apparatus begins to scan. In this way, it results in reduced time for locating the scanning starting point, a reduction of the errors described above, and enhancement of the accuracy in the scanning resolution and quality.

According to the object of the invention, it provides a scanning apparatus capable of locating a scanning starting point. The scanning apparatus includes a housing, a carriage, and a calibration paper. The housing includes a scanning platen for supporting a document to be scanned. The carriage, placed under the scanning platen, is for scanning objects supported by the scanning platen. The calibration paper is mounted on the scanning platen, adjoins one of the shorter sides of the scanning platen, and has a marked area. This marked area is defined by a set of functions and includes the scanning starting point for indicating the location of the document to be scanned on the scanning platen according to the scanning starting point. When the carriage is moved to a scanning line intersecting with the marked area, obtaining intersections of the carriage and the scanning line, the carriage locates the scanning starting point according to the intersections and the set of functions defining the marked area.

BRIEF DESCRIPTION OF THE DRAWINGS

Other objects, features, and advantages of the invention will become apparent from the following detailed description of the preferred but non-limiting embodiments. The description is made with reference to the accompanying drawings in which:

FIGS. 3A–3C are illustrations of the locating of the scanning starting point of the scanning apparatus according to a preferred embodiment of the invention;

FIG. 4 is a perspective view of the scanning apparatus according to the preferred embodiment of the invention;

DESCRIPTION OF THE PREFERRED EMBODIMENT

Figure 1:
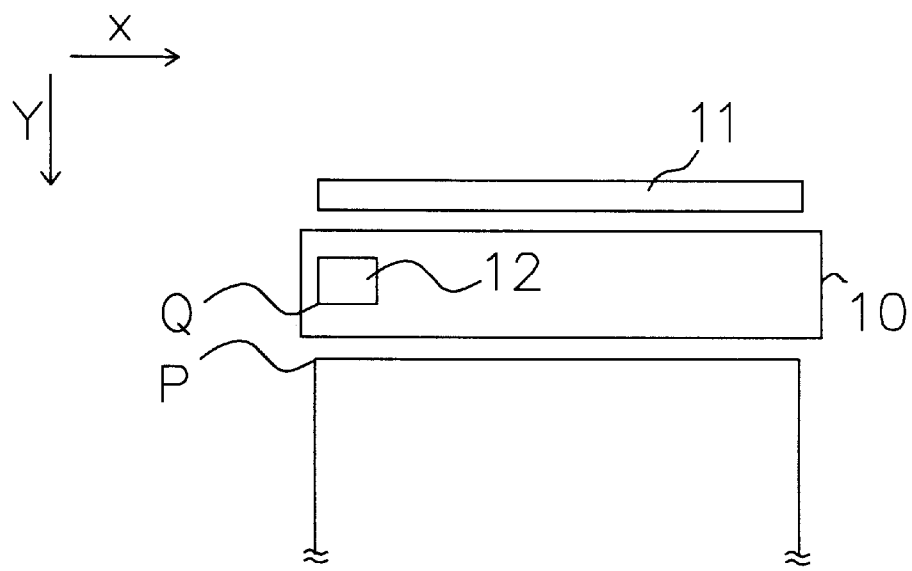
FIG. 1 (Prior Art) is an illustration of the locating of the scanning starting point of a conventional scanning apparatus.
Figure 2:
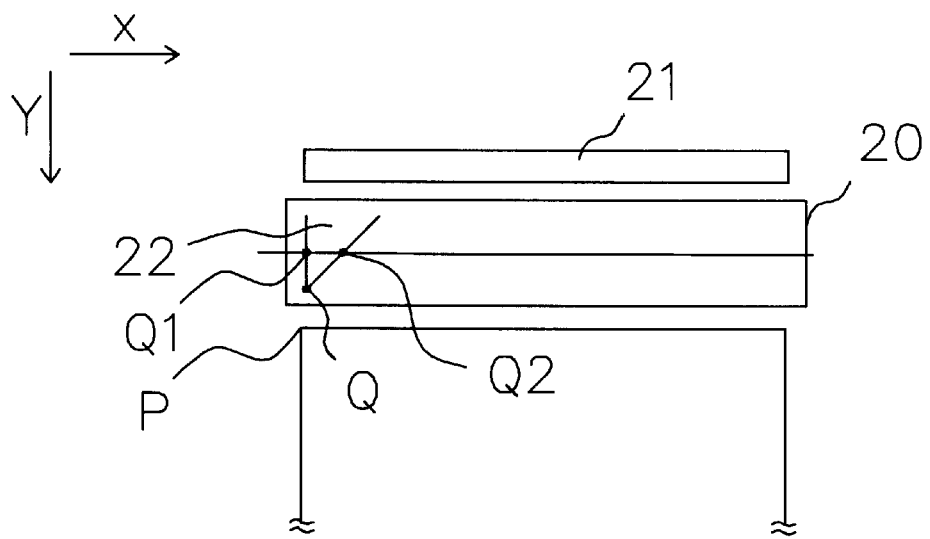
FIG. 2 (Prior Art) is an illustration of the locating of the scanning starting point of another conventional scanning apparatus.
Figure 3A:
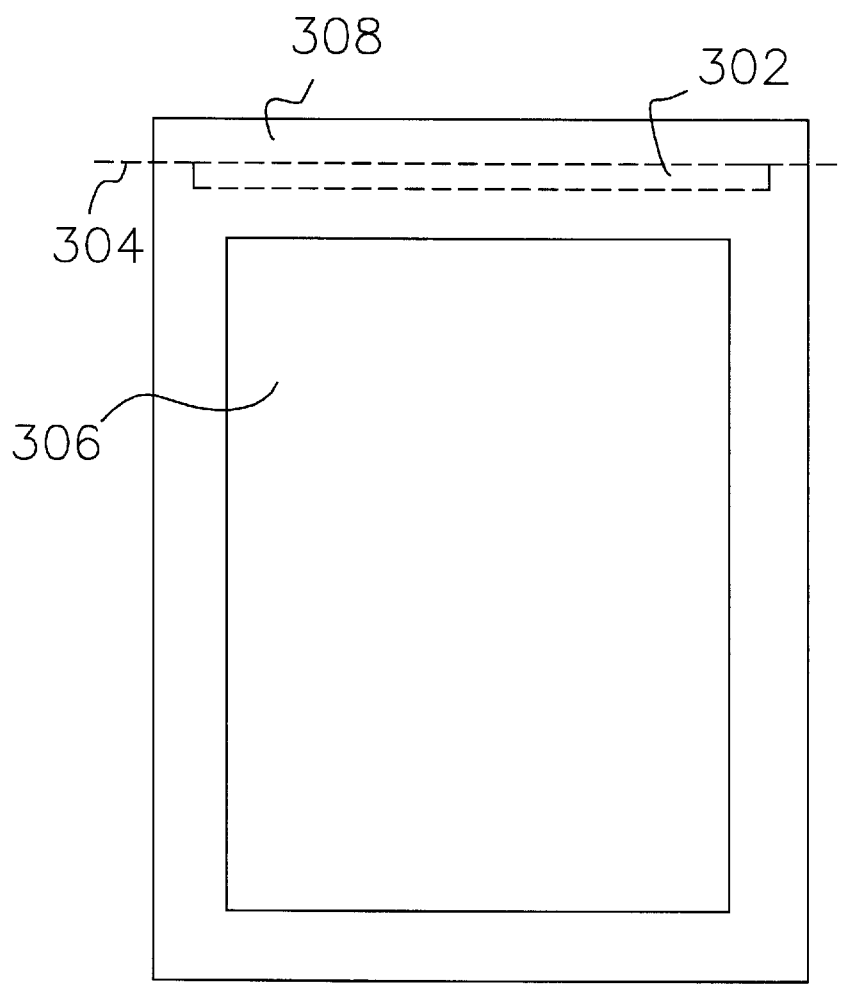
Figure 3B:
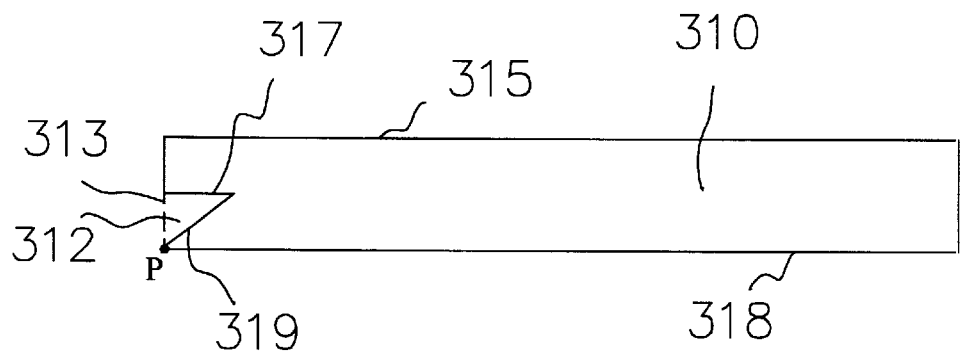

Referring to FIGS. 3A–3C, they illustrate the locating of the scanning starting point of the scanning apparatus according to the preferred embodiment of the invention. FIG. 3A illustrates the vertical view of the scanning apparatus, where the calibration paper has not been installed. FIG. 3B illustrates the calibration paper, which is used for locating the scanning starting point. FIG. 3C illustrates the calibration paper mounted on the scanning platen of the scanning apparatus. FIG. 4 shows a perspective view of the scanning apparatus according to the invention. When being in a ready state or not initiated, carriage 302 is on a starting line 304. Scanning platen 306, which is of rectangular shape and is inside the housing 308, is employed for placing a document (not shown) to be scanned. Carriage 302 is moved along the Y-axis for capturing the image of the document being scanned, where the X- and Y-axes are defined as shown in FIG. 3C. Calibration paper 310 is mounted on scanning platen 306 and adjoins the edge 311 of scanning platen 306. On the left side of calibration paper 310, there is a hollow marked area 312, which is an isosceles right-angle triangle. A side 313 of the triangle is parallel to the Y-axis and on the edge 316 of the scanning platen 306. Another side 317 of the triangle is perpendicular to the edge 316 and adjacent to the edge 311. Hypotenuse 319 and the side 313 intersect at point P, which is just on the edge 318 of calibration paper 310. Calibration paper 310 can be made from thick, stiff paper or plastics. Since calibration paper 310 is of a certain thickness, it can be mounted or stuck on scanning platen 306 after making calibration paper 310 coincident with the edges 311 and 316 of scanning platen 306 as much as possible. In addition, due to the thickness of calibration paper 310, if an appropriate mark is added on it for indicating the position for placing the document to be scanned, a user will naturally place the document to be scanned on the scanning platen, being coincident with the edge 316 of scanning platen 306 and the edge 318 of calibration paper 310. In other words, the user regards point P as the scanning starting point of the scanning apparatus. Thus, errors in the assembly of the scanning apparatus (e.g. the error that the edge 315 of calibration paper 310 is not coincident with the edge 311 of scanning platen 306) do not lead to the error in scanning. It is because no matter how wide the gap between the edges 315 and 311 is, where the gap is under an appropriate range, the only scanning starting point P that carriage 302 is to search is at the same position as the starting position for placing document to be scanned that the user is aware of. It is noted that the invention does not utilize any predetermined reference point and displacement vector relation between the reference point and the scanning starting point P. These are the two main differences between the invention and the conventional approaches.

The method for scanning the document using the scanning starting point is as follows. First, the document to be scanned is placed according to the scanning starting point P. Carriage 302 is then moved to a scanning line, such as the first scanning line 314 shown in FIG. 3C. The scanning line is not specifically selected and any scanning line through marked area 312 can be selected as the scanning line. The first scanning line 314 is for carriage 302 to detect marked area 312 and to obtain the coordinates of the intersections of the first scanning line 314 and hypotenuse 319, namely points A and B. Next, the coordinates of scanning starting point P are obtained since the distance of points A and P is equal to the distance of points A and B, according to the geometric theorem of the isosceles right-angle triangle. Finally, carriage 302 is moved to scanning starting point P and begins the scanning motion.

For obtaining a better quality of scanning, external light, which does not come from the scanning apparatus, must be blocked off during scanning. Thus, when scanning, scanning platen 306 is covered with upper cover 402, in which the upper cover adjoins housing 308. In addition, a plastic pad 404 of the same area of scanning platen 306 is commonly installed in upper cover 402, which makes upper cover 402 cover scanning platen 306 intimately, blocking off the external light when scanning documents of different thickness. On the other hand, during scanning, since scanning platen 306 is covered with upper cover 402, carriage 302 will sense the color of plastic pad 404 when it scans over marked area 312, which is hollow. For instance, if plastic pad 404 is black while calibration paper 310 is white, carriage 302 senses black when it scans over marked area 312. Therefore, for a better effect on the scanning, the colors of marked area 312 and plastic pad 404 should be chosen such that the contrast of the shading values between them is large. It should be aware that for most of the scanning apparatus, the marked area is recognizable if the colors are different.

In the above description, isosceles right-angle triangle is taken as marked area 312. It is certain that hypotenuse 319 of marked area 312 can be replaced by the curve of an arbitrary function, provided that the function is defined and set in the scanning apparatus before leaving the factory. If the curve of the function is a straight line of slope equal to one, the marked area 312 is an isosceles right-angle triangle. However, when scanning platen 306 is not closely covered with upper cover 402, a leak of light occurs and leads to difficulty in obtaining the coordinates of point A correctly. For resolving this problem, carriage 302 is moved to a scanning line, such as the second scanning line 320 shown in FIG. 3C, before moving to the first scanning line 314. The second scanning line 320 is in the region that does not include marked area 312, and intersects with the edge 316 of scanning platen 306 at point C. Since points A, C, and P all lie on the edge 316 of scanning platen 306, the X-coordinate of point C is equal to the X-coordinate of points A or P. Point C lies on the region where the leak of light does not occur. Thus, the X-coordinate of scanning starting point P can be obtained by using point C, and the coordinates of point P are finally obtained according to the coordinates of point B and the predefined function.

For instance, suppose that the coordinates of points B and C are $(x_1,y_1)$ and $(x_2,y_2)$ respectively. The X-coordinate of point C is then equal to the X-coordinate of points A and P, namely $x_2$. Since points A and B are lying on the same scanning line, they have the same Y-coordinate $y_1$. Thus, the coordinates of point A are $(x_2,y_1)$ and the length of segment AB is $x_1-x_2$. Since in the marked area, the hypotenuse is a straight line of slope equal to 1, the length of segment AP is equal to that of segment AB, resulting in the Y-coordinate of point P to be $y_1+x_1-x_2$. Thus, the coordinates of scanning starting point P are $(x_2, y_1+x_1-x_2)$. As depicted above, carriage 302 quickly and correctly determines the position of scanning starting point P, so as to begin to scan.

Figure 5:
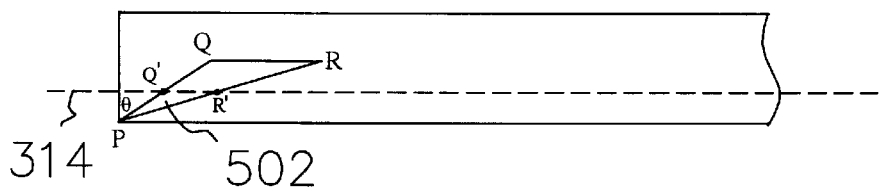
FIG. 5 is an illustration of the marked area in FIGS. 3A–3C in another shape.

For further resolving the problem of inaccuracy in locating the scanning starting scanning point due to a leak of light, the shape of the marked area can be changed into another form. Referring to FIG. 5, it illustrates the marked area in FIG. 3 in another form. In FIG. 5, marked area 502 is an obtuse isosceles triangle, wherein the vertex of the acute angle QPR is taken as the scanning starting point P. The opposite side of point P is parallel to the X-axis and points Q and R are the vertices of the obtuse and acute angles respectively. Thus, segment QR is equal to segment PQ in length, segment PR is the longest side of the isosceles triangle, and the angle θ between segment PQ and the Y-axis is known. When carriage 302 is moved to the first scanning line 314, it obtains the intersections of the first scanning line 314 and the segments PQ and PR, namely, points Q' and R'. Since the triangle Q'R'P is also an isosceles triangle, the coordinates of point P are calculated according to the geometrical relationship of the triangle Q'R'P and the angle θ. Therefore, utilizing the characteristic shape of the marked area, the coordinates of the scanning starting point are accurately obtained without being affected by any leak of light.

Figure 6:
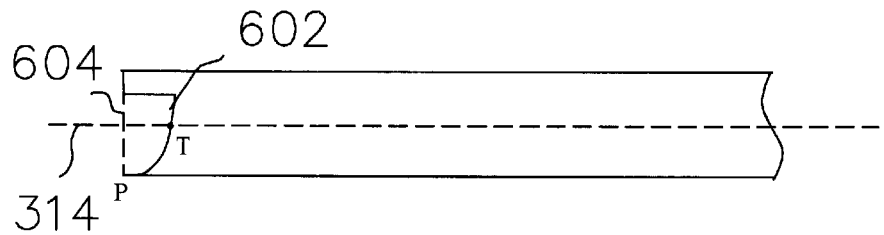
FIG. 6 is an illustration of the marked area in FIGS. 3A–3C when the bevel of the marked area is according to an arbitrary function.

Referring now to FIG. 6, it illustrates utilizing the curve of an arbitrary function instead of the hypotenuse of the marked area in FIG. 3. For the sake of simple implementation, the use of a simple function is preferred in practice. In FIG. 6, a parabola 602 is used and the intersection of parabola 602 and the vertical line 604 is taken as the scanning starting point P. When carriage 302 is moved to the first scanning line 314, the coordinates of the intersection (point T) of the first scanning line 314 and parabola 602 are obtained. The coordinates of point P are then obtained according to the function of the parabola and the coordinates of point T. Carriage 302 is then moved to the scanning starting point immediately and the scanning motion begins.

Figure 7:
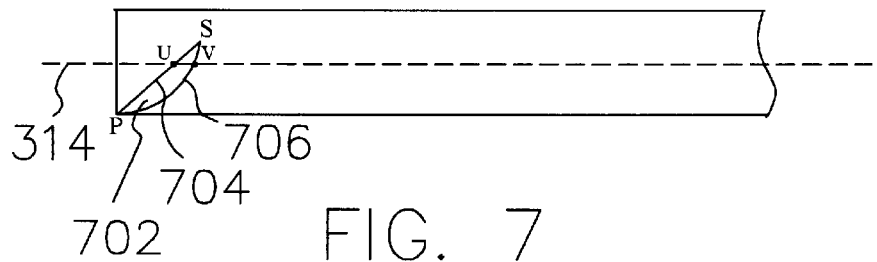
FIG. 7 is an illustration of the marked area according to two functions.

Referring to FIG. 7, it illustrates another example of the marked area, in which the marked area is defined by two predefined functions. In FIG. 7, curves 704 and 706 of the predefined functions define the boundary lines of marked area 702 and have intersections at points S and P, where point P is the scanning starting point and curve 704 defined by one of the predefined functions is a straight line. The intersections of the first scanning line 314 and curves 704 and 706 are points U and V. According to the predefined functions that define curves 704 and 706 and the relationship between points U and V, the coordinates of the scanning starting point P are calculated.

Figure 8A:
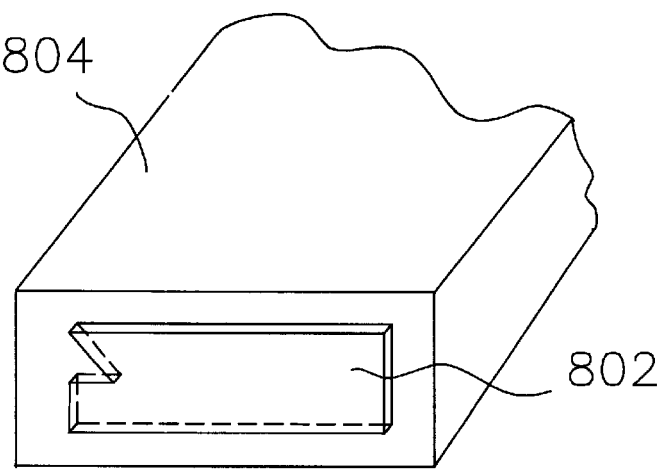
FIGS. 8A–8C illustrate the process of making the calibration paper of the invention by using the stamping method.
Figure 8B:
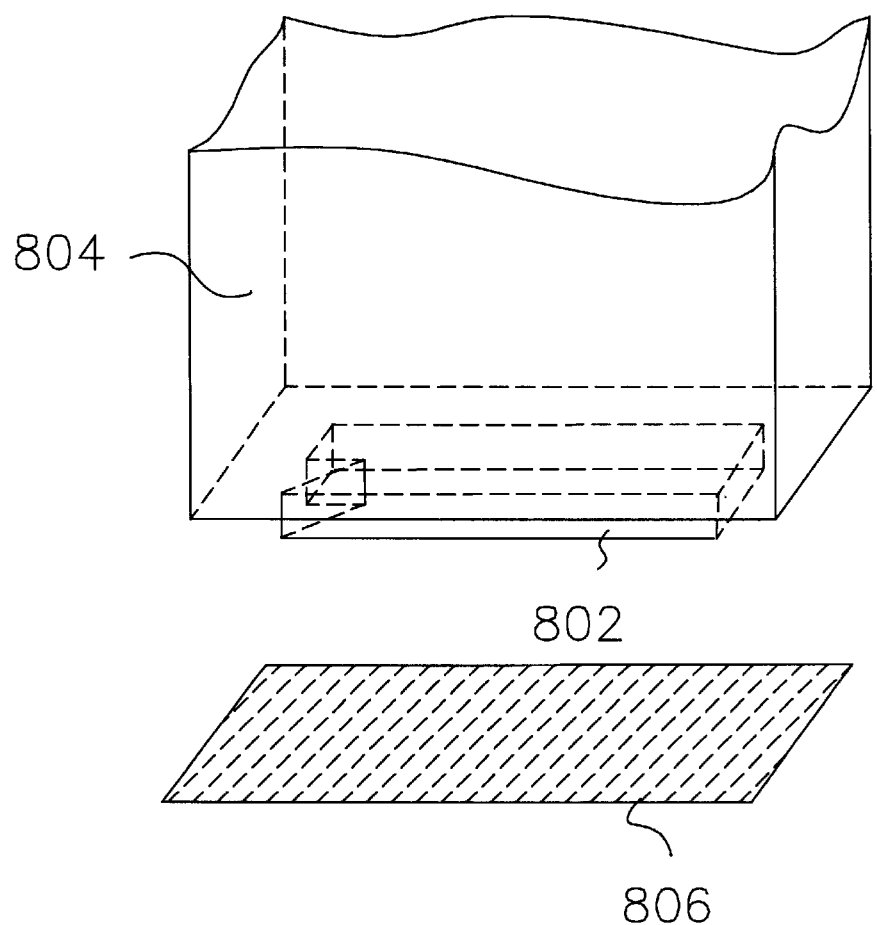
Figure 8C:
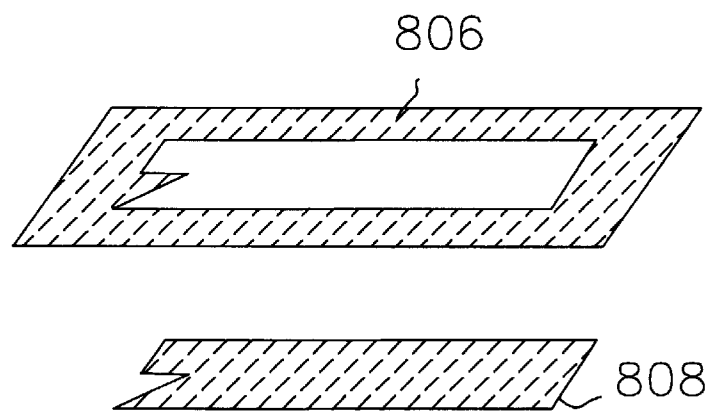

Referring now to FIGS. 8A–8C, it shows the process of the manufacturing of the calibration paper by the stamping method. FIG. 8A is the front view of the mold during stamping. FIG. 8B is an illustration before stamping while FIG. 8C is an illustration after stamping. Plate 802 of mold 804 is carved according to the design of calibration paper. During manufacture, calibration paper 808 is made by stamping mold 804 onto plastic 806.

The major feature of the invention is that there is no any predetermined reference point or displacement vector relation for the scanning apparatus. In the embodiment disclosed above, though the marked area that is hollow is produced by the use of the stamping method, the marked area can also be produced by the printing method in which the marked area is printed onto the complete calibration paper. However, errors in both printing and cutting compound the total error. The printing method includes steps of printing a number of marked areas on a piece of material and then cutting the individual marked areas on the material sequentially. Since the steps of printing and cutting are two different processes and inaccuracy in cutting commonly occurs, the error of the printing method is greater than that of the stamping method. As for the stamping method, errors may occur in the accuracy of making the molds; however, these errors are generally much smaller than the errors of the printing method. Calibration papers made by the printing method have their marked areas printed on them and so the marked areas are not hollow, reducing the problem of light leakage. This is the advantage of the printing method over the stamping method.

With regards to the marked area, although it is placed on the left of the calibration paper in the embodiment disclosed above, it can be placed in any arbitrary position as long as the indicator of how to place the document to be scanned definitely indicates the scanning starting point to the user.

In the above embodiment, since the calibration paper is mounted on the top of the scanning platen and plastic pad 404 of upper cover 402 is capable of covering calibration paper 310, the effect of leak of light occurs in the scanning platen is reduced. With regard to the size of the scanning apparatus, it will not be made larger when the calibration paper is added to the design because the size of the opening of the scanning apparatus' housing for placing the scanning platen can be adjusted within the fixed size that the whole scanning apparatus is set to. Moreover, although the marked area is illustrated in a large scale in the figures for the ease of illustration, in practice, a smaller marked area is sufficient to provide an adequate performance of the locating of the scanning starting point.

In the embodiment disclosed above, the scanning apparatus locates scanning starting point quickly and accurately. The making of calibration papers used for locating the scanning starting point is simple and has reduced error. The use of the marked area enhances the accuracy in locating the scanning starting point, speed and quality of the scanning of documents.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A scanning apparatus capable of locating a scanning starting point, comprising:
   a housing comprising a scanning platen for supporting a document to be scanned;
   a carriage placed under the scanning platen for scanning objects on the scanning platen; and
   a calibration paper mounted on the scanning platen and adjoining one of the shorter sides of the scanning platen, the calibration paper having a marked area defined by a set of functions, the marked area including the scanning starting point for indicating users to locate the document to be scanned on the scanning platen according to the scanning starting point;
   wherein when the carriage is moved to a scanning line intersecting with the marked area, obtaining intersections of the carriage and the scanning line, the carriage locates the scanning starting point according to the intersections and the set of functions defining the marked area.

2. A scanning apparatus according to claim 1, wherein the marked area is an isosceles right-angle triangle having a first right-angle side, a second right-angle side, and a hypotenuse, wherein the first right-angle side lies on one of the longer sides of the scanning platen, the second right-angle side is adjacent to the shorter side of the scanning platen that adjoins the calibration paper, and the scanning starting point lies at the intersection of the hypotenuse and the first right-angle side.

3. A scanning apparatus according to claim 1, wherein the marked area is an isosceles obtuse triangle, which comprises a first short side, a second short side, and a long side, wherein the second short side is perpendicular to one of the longer sides of the scanning platen and is adjacent to the shorter side of the scanning platen that adjoins the calibration paper, and the scanning starting point lies at the intersection of the longer side of the scanning platen and the first short side.

4. A scanning apparatus according to claim 1, wherein the marked area is defined by a first side, a second side, and a function, the first side lies on one of the longer sides of the scanning platen, the second side is perpendicular to the longer side of the scanning platen and is adjacent to the shorter side of the scanning platen that adjoins the calibration paper, and the scanning starting point lies at the intersection of a curve of the function and the first side.

5. A scanning apparatus according to claim 1, wherein the marked area is defined by a first function and a second function, a curve of the first function intersects a curve of the second function at a first point and a second point, and the scanning starting point lies at the first point.

6. A scanning apparatus according to claim 5, wherein the curve of the first function is a straight line.

7. A scanning apparatus according to claim 1, further comprising an upper cover for covering the top of the housing, wherein the inner side of the upper cover comprises a plastic pad for closely covering the scanning platen.

8. A scanning apparatus according to claim 1, wherein the calibration paper is made of plastics.

9. A scanning apparatus according to claim 1, wherein the marked area of the calibration paper is hollow.

10. A scanning apparatus according to claim 1, wherein the marked area of the calibration paper is made through stamping method.

* * * * *